(12) United States Patent
Sherony

(10) Patent No.: US 7,130,745 B2
(45) Date of Patent: Oct. 31, 2006

(54) VEHICLE COLLISION WARNING SYSTEM

(75) Inventor: Rini Sherony, Ypsilanti, MI (US)

(73) Assignee: Toyota Technical Center USA, Inc., Ann Arbor, MI (US)

( * ) Notice: Subject to any disclaimer, the term of this patent is extended or adjusted under 35 U.S.C. 154(b) by 80 days.

(21) Appl. No.: 11/055,218

(22) Filed: Feb. 10, 2005

(65) Prior Publication Data

US 2006/0178830 A1 Aug. 10, 2006

(51) Int. Cl.
*G01S 17/10* (2006.01)
*G01S 7/78* (2006.01)
*G01S 1/16* (2006.01)

(52) U.S. Cl. .......................... 701/301; 701/36; 701/48
(58) Field of Classification Search ................ 701/301, 701/300, 36, 44, 45, 48, 70, 117; 340/436, 340/437, 438
See application file for complete search history.

(56) References Cited

U.S. PATENT DOCUMENTS

| | | | | |
|---|---|---|---|---|
| 4,257,703 A | 3/1981 | Goodrich | ......................... | 356/4 |
| 5,373,657 A | 12/1994 | Betz et al. | ..................... | 42/100 |
| 5,576,972 A | 11/1996 | Harrison | ..................... | 364/516 |
| 5,912,815 A | 6/1999 | Kim et al. | ................... | 364/153 |
| 6,140,648 A | 10/2000 | Tsukamoto et al. | ......... | 250/353 |
| 6,246,961 B1 | 6/2001 | Sasaki et al. | ................ | 701/301 |
| 6,327,536 B1 | 12/2001 | Tsuji et al. | .................. | 701/301 |
| 6,470,273 B1 * | 10/2002 | Halsted et al. | .............. | 701/301 |
| 6,556,916 B1 | 4/2003 | Waite et al. | ................ | 701/117 |
| 6,581,007 B1 | 6/2003 | Hasegawa et al. | .......... | 701/301 |
| 6,590,719 B1 | 7/2003 | Bos | ............................ | 359/753 |
| 6,594,582 B1 | 7/2003 | Quinn | ........................ | 701/213 |
| 6,594,583 B1 | 7/2003 | Ogura et al. | ................ | 701/301 |
| 6,697,146 B1 | 2/2004 | Shima | ........................ | 356/3.14 |
| 6,714,139 B1 | 3/2004 | Saito et al. | ................. | 340/903 |
| 6,757,109 B1 | 6/2004 | Bos | ............................ | 359/753 |
| 7,005,974 B1 * | 2/2006 | McMahon et al. | .......... | 340/435 |
| 7,038,577 B1 * | 5/2006 | Pawlicki et al. | ............. | 340/435 |

FOREIGN PATENT DOCUMENTS

| | | |
|---|---|---|
| JP | 04-256268 | 9/1992 |
| JP | 04-304988 | 10/1992 |
| JP | 05-209584 | 8/1993 |
| JP | 09-018524 | 1/1997 |

* cited by examiner

*Primary Examiner*—Richard M. Camby
(74) *Attorney, Agent, or Firm*—Gifford, Krass, Groh, Sprinkle, Anderson & Citkowski, P.C.

(57) ABSTRACT

An apparatus for facilitating avoidance of a vehicle collision with an object, comprises a vision sensor providing image data, and an image analyzer, operable to provide an estimated time to collision of the vehicle with the object. The estimated time to collision is determined from a rate of expansion of an image element corresponding to the object within the image data, and the apparatus provides a warning if the estimated time to collision is less than or approximately equal to a predetermined time.

27 Claims, 4 Drawing Sheets

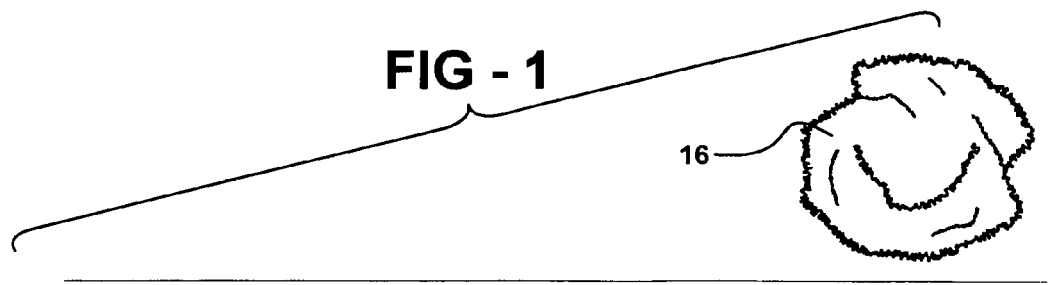
FIG - 1
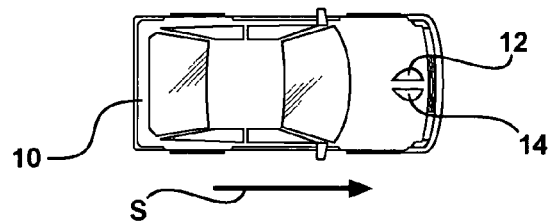
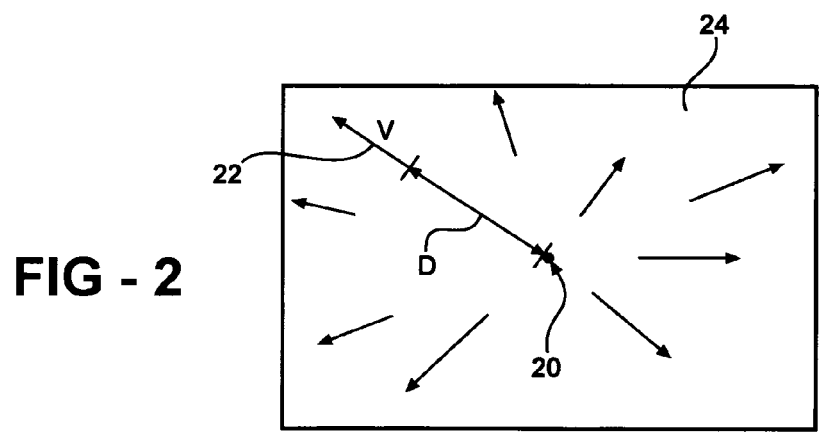
FIG - 2
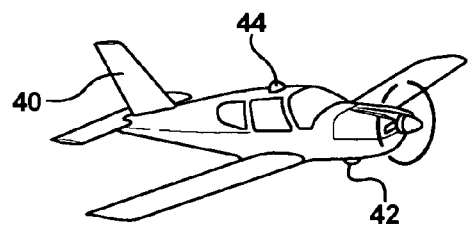
FIG - 3A
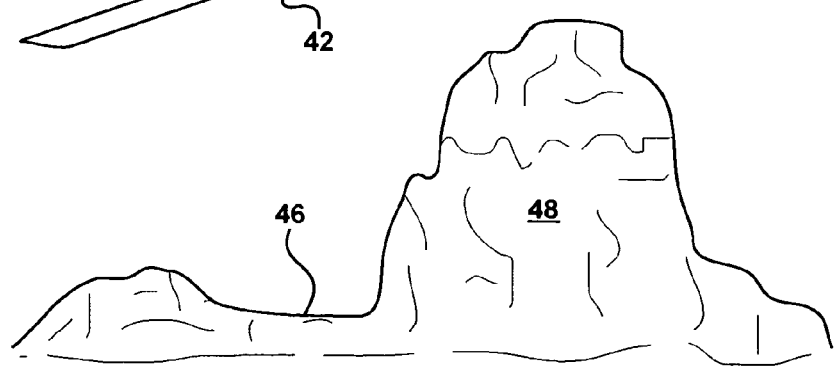

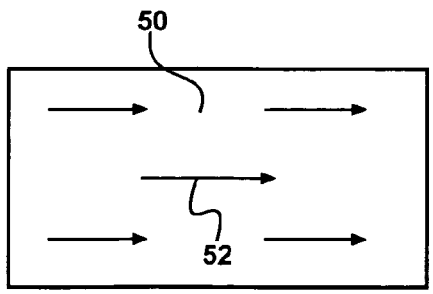
FIG - 3B
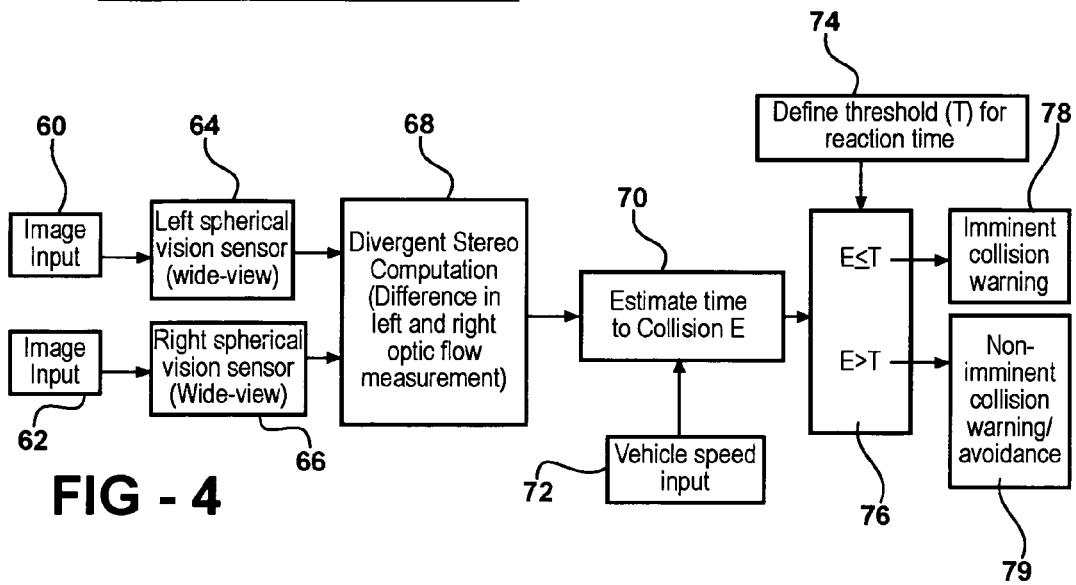
FIG - 4
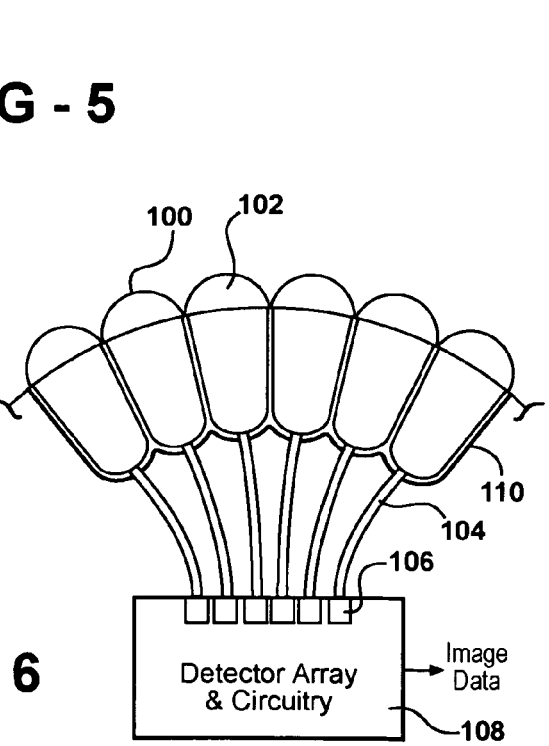
FIG - 5
FIG - 6

FIG - 7
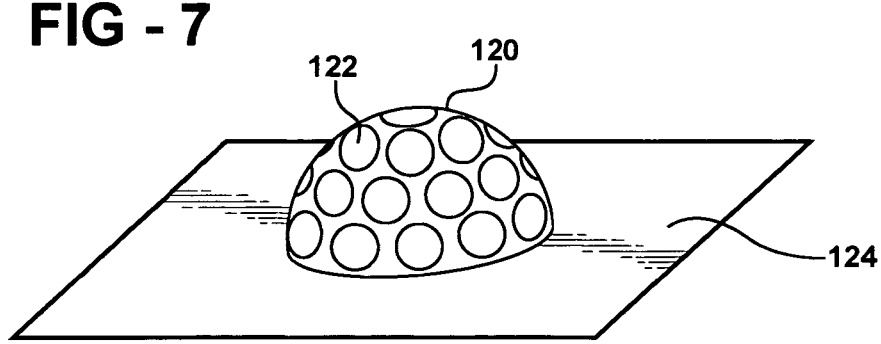
FIG - 8
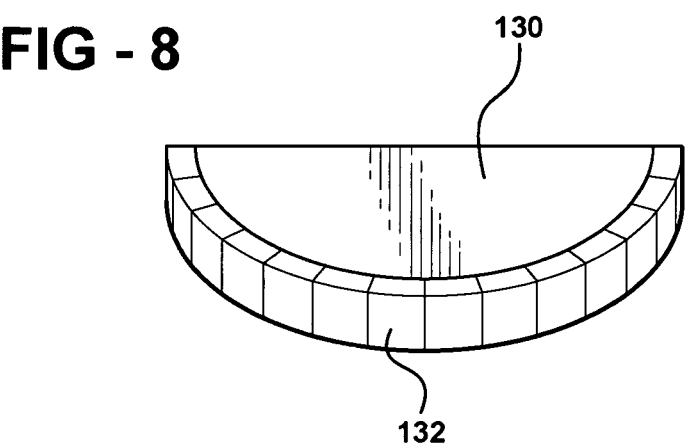
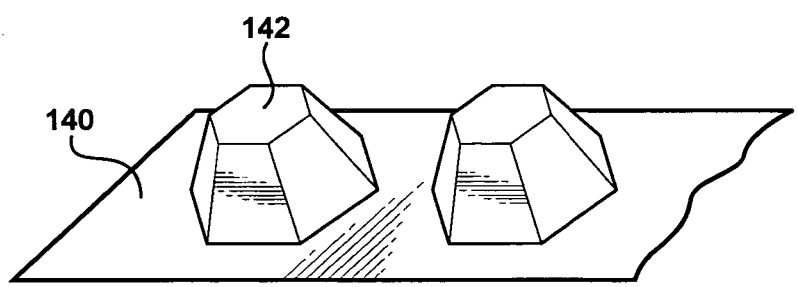
FIG - 9A
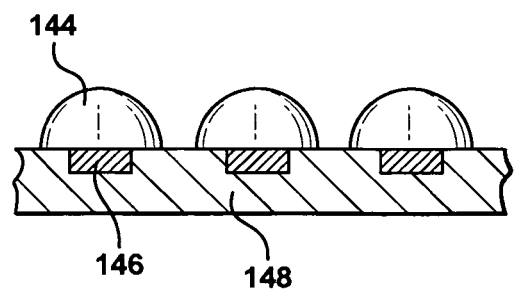
FIG - 9B

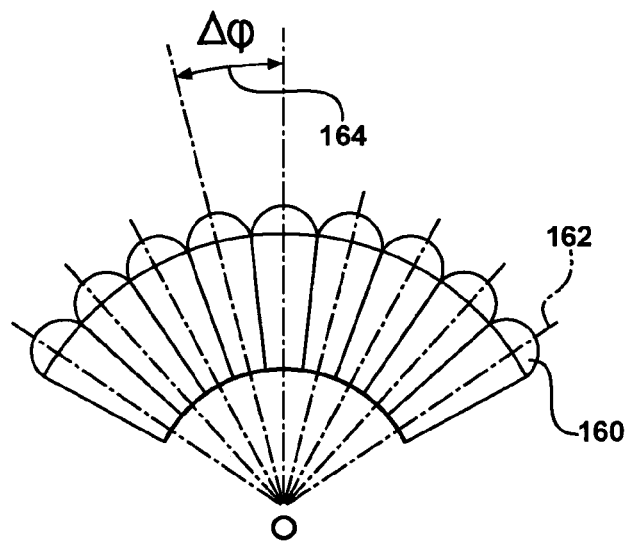
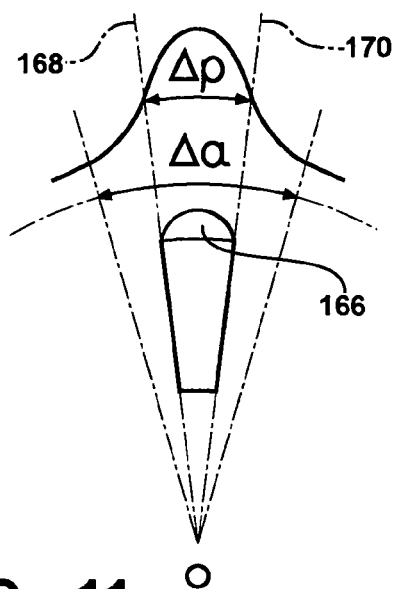
FIG - 10  FIG - 11
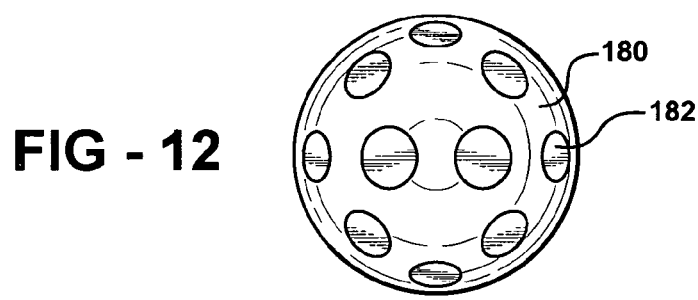
FIG - 12
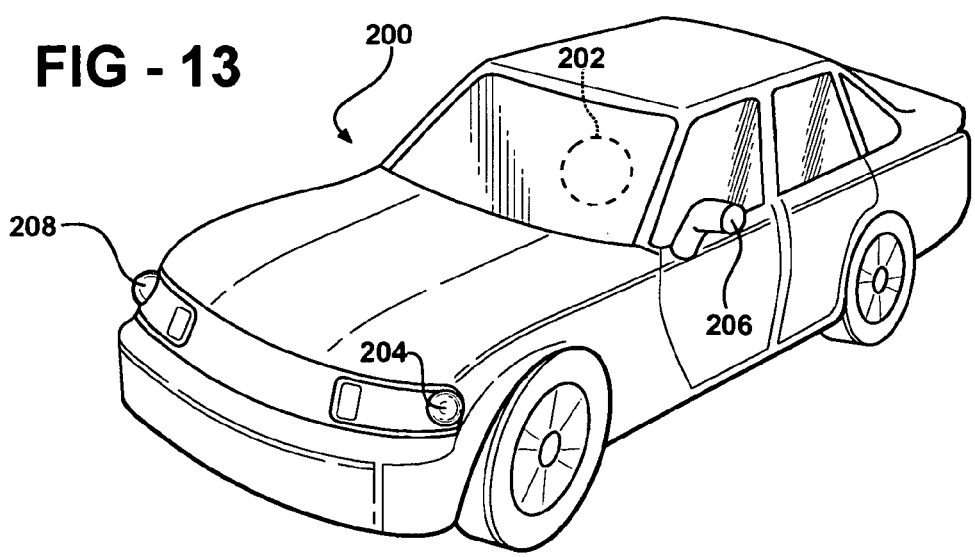
FIG - 13

VEHICLE COLLISION WARNING SYSTEM

FIELD OF THE INVENTION

The invention relates to collision warning methods and apparatus for vehicles.

BACKGROUND OF THE INVENTION

Optical flow is a measure of image movement across a visual field. It is the apparent motion of image brightness patterns in a sequence of images. In an image each pixel corresponds to the value obtained by the projection of a three-dimensional image onto an image plane. When an object moves, the corresponding projection, or image element within the image data corresponding to object, changes position in the image plane. Optical flow is the vector field showing the direction and magnitude of such changes from one image to the other.

In conventional stereo vision based collision avoidance approaches, the actual distance to a remote object is calculated. However, such distance measurements may be difficult in changing environmental conditions. Hence, an improved collision warning system would not necessarily determine the actual distance to a remote object.

SUMMARY OF THE INVENTION

An apparatus for facilitating avoidance of a vehicle collision with an object comprises a vision sensor providing image data, and an image analyzer, operable to provide an estimated time to collision of the vehicle with the object. The estimated time to collision is determined from a rate of expansion of an image element corresponding to the object within the image data, and the apparatus provides a warning if the estimated time to collision is less than or approximately equal to a predetermined time. The vehicle speed can also be used to estimate the time to collision.

In one example, an apparatus includes a pair of vision sensors oriented so as to each provide image data from substantially non-overlapping portions of the vehicle surroundings. This orientation is a divergent stereo configuration. A pair of vision sensors may be oriented in opposite directions, both orthogonal to the direction of travel, for example on the left and right sides of a vehicle.

The image analyzer performs an optical flow analysis of the image data, and determines an optical flow vector for image elements within the image. The possibility of a collision is determined by the location of any focus of expansion relative to the optical flow of an image element, as described in more detail below. The focus of expansion is a point from which optical flow vectors appear to diverge, and is correlated with the vehicle direction.

A method of facilitating avoidance of a vehicle collision with an object comprises providing at least one vision sensor providing a wide field of view of the vehicle surroundings, obtaining time-sequential image data of the vehicle surroundings, identifying an image element (within the time-sequential image data) corresponding to an object within the path of the vehicle, and determining a time to collision with the object using an optical flow of the image element and, optionally, using vehicle speed data to provide a more accurate time to collision. For example, vehicle speed changes can be accounted for in the calculation of time to collision. The magnitude of the optical flow vector is correlated with a rate of expansion of the image element within the image data. A collision avoidance response, such as a warning to the vehicle operator, is given if the time to collision is less or equal to a predetermined time.

BRIEF DESCRIPTION OF THE FIGURES

FIG. 1 shows a system according to the present invention in which two wide angle vision sensors are provided on a vehicle;

FIG. 2 illustrates an optical flow vector field within a field of view;

FIG. 3A illustrates a pair of sensors provided on an airplane;

FIG. 3B illustrates an optical flow vector field arising from moving terrain;

FIG. 4 is a flowchart illustrating operation of a system according to the present invention;

FIG. 5 shows a cross section, of a vision sensor including a plurality of microlenses;

FIG. 6 shows a possible configuration of microlenses;

FIG. 7 illustrates a possible configuration of microlenses and optical fibers;

FIG. 8 shows a possible two-dimensional configuration of microlenses;

FIG. 9A illustrates a faceted lens;

FIG. 9B illustrates lenses on a flexible substrate;

FIGS. 10 and 11 illustrate the acceptance angle of a vision sensor comprising a plurality of microlenses;

FIG. 12 illustrates a spherical mounting structure for a plurality of lenses; and FIG. 13 illustrates a possible location positions for vision sensors on an automobile.

DETAILED DESCRIPTION OF THE INVENTION

An improved apparatus for collision avoidance comprises one or more vision sensors providing image data, and an image analyzer. The image data contains an image element corresponding to an object in the path of the vehicle. The image analyzer provides an estimated time to collision of the vehicle with the object, and initiates a collision avoidance response, for example an audible or visual warning provided to the vehicle operator.

The estimated time to collision is determined from a rate of expansion of the image element within the image data, for example using optical flow analysis of the image data.

In examples of the invention, two vision sensors are used, each having a wide field of view, such as a semicircular or hemispherical field of view. The two vision sensors are located so as to face in opposite directions, or otherwise widely diverging directions. The two vision sensors hence can hence provide an all-around view. This is in contrast with conventional stereo image systems, where two vision sensors are spaced apart but typically face in the same direction.

The vision sensors provide wide-angle fields of view. In this context, a wide-angle field of view exceeds 90°. A single wide angle lens can be used, such as a fish-eye lens, directing light to a detector array. In this application, the term detector is used to refer to, for example, a light-sensitive element providing an electrical signal. Detectors may be provided as detector arrays, such as a CMOS detector array of the type conventionally used in a digital camera. In other examples, a vision sensor includes a number of light collectors, such as lenses, distributed over a curved surface.

The vision sensor may be analogous to the eye of an insect. Microlenses can be used as the light collectors, each microlens directing light from a part of the image field to an individual light detector. For example, the vision sensor may have a curved outer surface supporting a number of light collectors. A light-guiding arrangement can be used to direct light to a detector array.

Two vision sensors may be provided in a divergent stereo configuration, in which the fields of view of the vision sensors do not appreciably overlap. In conventional stereo imaging, a distance to an object is determined from image elements arising from the same object provided by both vision sensors. The divergent stereo approach avoids the need to determine accurate quantitative distances. Instead, a qualitative distance is determined from the rate of expansion of an image element and, optionally, the speed of the vehicle. A rapidly expanding image element corresponds to an object with which the vehicle may collide in a short time. It matters less, from the viewpoint of collision avoidance, what the object actually is, and its actual (quantitative) distance from the vehicle.

FIG. 1 shows a vehicle 10 having a pair of vision sensors 12 and 14 disposed on opposed sides of the vehicle. The vehicle moves with a velocity S towards an object presenting a collision risk, in this example a tree 16.

In this example, the first and second vision sensors 12 and 14 have fields of view that are each approximately 180 degrees, at least within the plane of the ground surface. The vision sensors have major optical axes (axes central to the field of view) that are oriented at 180 degrees to each other, so that the images produced by both sensors cover substantially all the environment of the vehicle.

As the vehicle approaches the tree 16, an image element corresponding to the tree will show an expansion. If the expansion of the image element contains the focus of expansion (FOE), discussed further below, this indicates that a collision is possible.

FIG. 2 illustrates a field of view 24, containing a plurality of optical flow vectors such as vector 22 diverging from focus of expansion (FOE) 20. The optical flow vectors can be derived from time-sequential image data, as is known in the image processing art. The faster an image element is expanding with time, the greater the optical flow vector. The magnitude of the optical flow vector is correlated with the relative speed with which the vehicle is approaching the object.

The focus of expansion (FOE) indicated at 20 indicates the vehicle direction of heading. A high magnitude diverging optical flow is caused by a rapidly approaching object.

The rate of expansion of the optical field is represented by the magnitude of the optical flow vector V, in this representation the length, and the distance from the FOE is denoted D. The optical flow data is derived from image data using an image analysis system.

In a collision warning system, an imminent collision can be detected by measuring the relative rate of expansion. Using V to denote the rate of expansion and D the distance from the FOE, the ratio D/V is a first order approximation of how soon the vehicle will collide with the object.

The term optical flow is used here to refer to apparent movement of an image element (texture) in the image field, corresponding to an object (or to an edge or component of the object) resulting from either motion of the vehicle and/or motion of the object.

Information from optical flow can be used to determine depths, at least qualitatively, including the presence of objects in the path of the vehicle. Objects forward of the vehicle can be detected from expansion or equivalent divergence of the forward optical field. Rapid expansion is correlated with a closer proximity and with a greater relative approach velocity of the object.

The focus of expansion (FOE) from which the optical flow originates indicates the direction the vehicle is heading. If the FOE is located outside a rapidly expanding region, this implies the vehicle may go close to an object, but will miss it.

FIG. 3A shows an airplane 40 flying over surface terrain 46, including hill 48. The airplane is provided with first and second vision sensors 42 and 44. The downward sensor 42 captures image data from the ground. In level flight, typically, the airplane heading will not be located in data from this sensor, so that a FOE will not be present in image data from this sensor.

FIG. 3B indicates a typical optical flow pattern 50 obtained, for example using the downward facing sensor 42 of the example above. A raised part of terrain, such as the hill 48, causes a greater optical flow 52, corresponding to optical flow vectors having greater magnitude, due to the greater proximity. However, since there is not expansion from an FOE, a collision is not imminent. However, a warning may be provided if the optical flow exceeds a certain threshold value, or if an FOE exists.

In other examples, the pair of vision sensors may be located on left and right sides of the airplane, or front and rear. Six vision sensors may be provided, with views in orthogonal directions. Any image overlap may be used to introduce redundancy or data averaging, rather than for conventional stereoscopic distance ranging.

FIG. 4 shows a schematic of a system according to the present invention. Boxes 60 and 62 represent light being incident on first and second vision sensors, respectively. The pair of vision sensors are in a divergent stereo configuration, with the two sensors essentially facing in opposite directions, lateral to the direction of vehicle heading. The incident light can be filtered, passed through a polarizer (for example, to remove glare from road surfaces and the like), and may include reflected light from a light source associated with the system.

Boxes 64 and 66 represent the first and second vision sensors, respectively, providing image data. Box 68 represents an optical flow analysis of the image data. For example, a divergent stereo computation can be performed, as discussed in more detail below, in which a difference between optical flow between image data from the first and second vision sensors is determined.

Box 70 represents the calculation of an estimated time to collision, E. For example, image elements corresponding to objects within the heading of the vehicle are identified, and an estimated time to collision E is estimated from D/V, where V is the magnitude of the optical flow vector (related to movement of a point of the obstacle within the image data with time), and D is the distance from that point to the focus of expansion.

Optionally, the difference in the optical flow rates from first and second vision sensors can be determined, and used to find an estimated time to collision. Optional corrections for vehicle speed variations, and cornering of the vehicle, can also be made.

Box 72 represents receiving a vehicle speed value from a vehicle speed sensor. The vehicle speed input can be used compensate for the effect of vehicle speed changes on image data, allowing a more accurate determination of the rate of expansion. Box 74 represents an input of a predetermined threshold (T) for reaction time, for example from a value stored in memory. The vehicle speed input can optionally be used to modify the predetermined threshold (T) for reaction time. For example, T can be shorter at higher vehicle speeds.

Box 76 represents a comparison of the estimated collision time E (determined from optical flow analysis) with the predetermined reaction time T. Box 78 corresponds to providing an imminent collision warning to the vehicle operator if the estimated time to collision E is less than or equal to the reaction time T, or $E \leq T$. This may be accompanied by vehicle control inputs, such as braking or steering inputs. Box 79 corresponds to provision of a non-imminent collision warning to the vehicle operator, and possibly suggestions for methods of collision avoidance, if E is greater T (E>T).

A divergent stereo computation can be performed by calculating the difference in the average optical flows between the left and right vision sensors, which cover part of the left and right side of the vehicle. The vision sensors have lateral optical axes, with an angular separation of 180 degrees. This optical flow difference can be used to determine a qualitative distance to obstacles in the vehicle path, as the rate of expansion will be different depending on the relative velocity of the vehicle and the object.

Also, a general optical flow background arising from stationary objects can be subtracted out from image data. For a vehicle driving on the right of a two lane road, the right vision sensor may provide the general flow background, and when subtracted from the left image sensor data will allow more accurate collision avoidance detection.

In general, significant differences in left and right image sensor data may be detected, and these differences analyzed to provide an advanced warning of a collision.

To determine if an oncoming vehicle in the vehicle lane, rather than an adjacent lane, a number of different approaches can be used, including detection/recognition of road markings. Road markings can be provided for use with such systems, for example comprising similar distinct patterns, such as geometric patterns, along both sides of a vehicle travel lane.

When an automobile is in the middle of a travel lane, the difference in the optical flow signal between left and right, originating from road markings, is zero, assuming similar markings on both sides. As the automobile moves closer to left lane marking, the optical flow difference becomes positive, and if the vehicle moves closer to the right lane markings the difference becomes negative. A threshold value can be defined based on existing standard highway lane widths, and the difference in optical flow vectors compared with the thresholds, to determine if the vehicle is close to the lane markings on either side of the lane. This can be used to provide a lane departure warning.

FIG. 5 illustrates a cross-section through a vision sensor design comprising outer surface 80, array of microlenses such as microlens 82, detector 84, detector electrical connection 86, and analysis circuit 88. The outer surface of the vision sensor may have an undulating surface as shown in the figure, or optionally may have a smooth outside surface. Other surface forms are possible.

Each microlens directs light to a detector. The intervening space 90 between the microlens and the detector may be filled with air or other transparent medium. For example, the lens may be a unitary structure comprising a convex lens portion (such as 82) and an elongated light guide structure (such as 90). Separators, such as walls, between detectors may be formed from a light absorbing or reflecting material.

Hence, the vision sensor comprises a plurality of vision sensor elements, comprising a lens, detector, and optionally light guide portions and inter-element separators such as walls.

FIG. 6 shows another configuration for a vision sensor in cross-section, comprising array of microlenses such as microlens 102, light guides such as optical fiber 104, and detector 106, the detector being part of a detector array 108. The vision sensor may have an undulating outer surface such as 100 or a smooth surface. The separators 110 between vision sensor elements may be an absorbing or reflecting wall.

The Figure illustrates a configuration in which light from a predetermined direction and angular range is collected and channeled to a detector. The detector may be part of a conventional detector array.

The microlenses may be arranged as a three-dimensional array over a hemisphere, or alternately may be disposed in a two-dimensional array around the periphery of a semicircle. Other configurations are possible, for example providing a wide field of view in a horizontal plane (the road surface), and a reduced field of view (such as 30° or less) in a vertical plane.

FIG. 7 shows a possible arrangement of microlenses on a substantially hemispherical surface 120. Microlenses are indicated as circles such as microlens 122. The vision sensor may sit on a substrate 124, which may be part of a vehicle or a structure attached to a vehicle surface.

FIG. 8 shows a possible two-dimensional configuration of microlenses 132 around a housing 130 providing a semicircular periphery. This configuration provides a wide field of view in a single plane. Two such devices, configured to face in opposite directions, may be used to provide complete environmental awareness in at least one plane around the vehicle.

Microlenses may be spherical, bead shaped, teardrop shaped, other geometrical shape, or other form. In other examples, lenses may be pyramidal, or contain polygonal sections.

FIG. 9A shows two faceted lenses, each including a plurality of plane surfaces such as 142, on a substrate 140. Such a lens may be used as for light collectors for a vision sensor. They may provide less accurate intensity data, but may be cheaper to fabricate.

In other examples, a light collector may not include a lens. A window or aperture may accept light from a predetermined direction, or angular range, and a light guiding structure such as a fiber or hollow tube (for example, with internal reflective surfaces) used to guide light to a detector. A light collector may also comprise a mirror.

FIG. 9B shows an array of microlenses such as microlens 144 formed in register with a detector, supported by (in this example, embedded in) substrate 148. Vision sensors may be fabricated in a flat or planar configuration, and then curved or otherwise shaped so as to provide an enhanced field of view. For example, a flexible (e.g. plastic) substrate may be used, and curved into, for example, a semi-cylindrical or cylindrical form to provide a wide angle vision sensor. In other examples, a flexible substrate may be folded into a geometric shape, such as a pyramid or polyhedron.

FIG. 10 illustrates the acceptance angle of discrete light collectors. The space or sampling frequency angle $\Delta\phi$ as illustrated at 164 corresponds to the angle between lines (such as 162, a microlens optical axis) through the center of adjacent microlenses (such as 160), or inter-microlens angle.

Example vision sensors according to the present invention may include a plurality of microlenses arranged over a curved surface. Each microlens may direct light from a predetermined narrow angular range within the visual field to a detector. The narrow angular range FIG. 11 illustrates that for each light collector, the half width of a Gaussian-shaped sensitivity distribution can defined by an acceptance angle $\Delta\varrho$ (between radial lines 168 and 170) and the aperture angle $\Delta\alpha$. Element 166 represents a microlens.

FIG. 12 shows an example in which multiple lenses are arranged over a substantially spherical surface. A spherical housing 180 supports a plurality of lenses, such as lens 182, distributed over the spherical surface of the housing. A support strut may be used to support the housing.

FIG. 13 illustrates possible locations of vision sensors on a vehicle 200. For example, vision sensors may be located adjacent to front headlights at 204 and 208. Optionally, vision sensors may be provided on the side of the vehicle, such as on wing mirror 206. Vision sensors may also be part of headlights, and designed to receive reflected light provided by the headlight.

A visual warning may be provided to the driver through projection of a warning image onto a portion of the windshield at 202.

System Configurations

Examples of the present invention use vehicle speed as an input to assist determination of collision danger, for example by estimating a time to collision using vehicle speed and the magnitude of an optical flow vector of an image element corresponding to an object in the path of the vehicle.

Vehicle speed may be provided by a vehicle speed sensor, a GPS system, or other device. The use of vehicle speed differentiates examples of the present invention from various conventional systems.

Example improved collision warning systems do not require extensive hardware or image processing capability, compared with a conventional object detection based on image recognition or distance detection measurement.

Example improved systems include a pair of expanded field of view vision sensors (equivalently, cameras). Each vision sensor can comprise a plurality of lenses so as to allow a wide field of view. The optical axes of the two vision sensors can be directed in substantially opposed directions so that the fields of view of each vision sensor do not overlap. This is in contrast to traditional stereo optical systems, where the optical axes of a pair of cameras will generally be parallel to an object to be imaged.

Example apparatus and methods according to the present invention provide better estimation of possibility of a collision, without the necessity of determining actual distance to an object, or of identifying an object in the path of the vehicle. Further, improved apparatus can provide more precise optical flow information over different areas of the imaged field.

An example apparatus or method does not require quantitative range determination or the determination of the shape or outline of an object. A qualitative distance is measured in terms of image velocity.

In a conventional stereo system, a quantitative determination of range is obtained, which can be practically difficult in certain conditions. In contrast, an example approach according to the present invention, for example a divergent stereo approach, does not necessarily make any attempt to compute the actual distance to an object. A qualitative distance is determined, which implicitly includes the speed of the vehicle. If the vehicle moves faster, objects are perceived as having a closer qualitative distance. Similarly, if the vehicle moves slowly, objects are perceived as having a greater qualitative distance. In this approach, time to collision is an important factor. Hence, the qualitative distance is a more useful parameter.

Optical Flow Analysis

Examples of the present invention use optical flow analysis to estimate a time to collision with an object in the path of the vehicle.

Example approaches to optical flow determination, which may be used in examples of the present invention, are described in U.S. Pat. No. 6,594,583 to Ogura et al., U.S. Pat. No. 6,581,007 to Hasegawa et al.; U.S. Pat. No. 6,246,961 to Sasaki et al.; U.S. Pat. No. 5,912,815 to Kim et al.; and U.S. Pat. No. 4,257,703 to Goodrich et al. Other approaches will be recognized to those skilled in the image processing art. Further image processing techniques, including the suppression of road surface related signals, which may be used in examples of the present invention, are described in U.S. Pat. No. 6,714,139 to Saito et al.

For example, an image analyzer may comprise a processor, a software program executable by the processor, and a memory, the software program operable to determine optical flow from time sequential image data stored in the memory. Optical flow determination may include identification of image elements showing expansion with time. Actual identification of the objects giving rise to the corresponding image elements is not necessary.

An apparatus according to the present invention may use a divergent stereo approach, for example using a pair of vision sensors directed in opposite directions, for example each vision sensor being oriented at right angles to the direction of travel. Differences in optical flow between image data provided by left and right vision sensors can be used in lane-centering applications. Image enhancement of road marking data may be used with automated lane centering provided by differences in optical flow from divergent stereo imaging sensors.

The difference in optical flows between a pair of vision sensors directed in opposite directions can be defined as the difference in the average optical flows between the two vision sensors. The two vision sensors can be configured to provide image data from the left and right side of the vehicle, for example being mounted inside or outside the vehicle body with lateral optical axes. The difference can be measure approximate distances to obstacles in the path of the vehicle, but not to measure exact distance to the object. The difference can be used to determine whether there is a vehicle coming from the other direction because of the rate of expansion will be different from when the other object is traveling in the same direction or is stationary. Image data analysis of signals from lane markings, vehicle speed sensors, and inputs from vehicle steering controls can be used to distinguish between vehicles approaching in the same lane, and those in an adjacent lane.

Vision Sensor Configurations

An example system provides two vision sensors such that their major optical axes are oriented so as to be laterally opposed, i.e. at approximately 180 degrees to each other. This configuration is unlike conventional systems such as traditional stereo vision systems, where optical axes of multiple cameras are generally parallel. Examples of the present example may use a divergent stereo approach.

The field of view may be measured within a single plane, for example a plane parallel to the surface on which the vehicle is located. In other examples, the field of view may be hemispherical (180 degrees measured in any plane), and in further examples such as those described below, may exceed 180 degrees.

Other configurations of wide angle of view vision sensors can be used, such as those using multiple cameras, multiple mirrors, and other lens or mirror configurations configured, for example, so as to obtain a wide angle field of view, such as a substantially hemispherical field of view.

In other configurations, two sensors may be located on opposite sides of a vehicle, or on opposed surfaces of a post, fin, strut, flange, or other structure emerging from a surface of a vehicle.

A spherical or circular cross-sectional member may be provided having a first vision sensor and second opposed vision sensor, the two vision sensors having substantially opposed directions of optical axis. Optionally, a second pair of vision sensors can be provided.

There can be some duplication of optical flow data obtained, for example from a system having more than two vision sensors, each having a hemispherical field of view. However, this duplication can increase the safety and accuracy of the system, for example by providing vision sensor redundancy or data averaging.

Vision Sensor Design

In examples of the present invention, vision sensors comprise a plurality of light collectors, such as microlenses. The light collected by each microlens is guided to an optical detector, for example the array of microlenses providing light to a detector array.

In examples of the present invention, the light collectors are distributed over a curved surface, such a surface that is arcuate, hemispherical, or other circular or conic section in one or more dimensions. Vision sensors may also have polygonal outer surfaces. In other examples, light detectors can be distributed over a curved surface, such as an arcuate or hemispherical surface. The use of microlenses or other light collectors to guide light to the detectors is optional.

Vision sensors can comprise a plurality of individual light detectors, such as photocells, each receiving light from a predetermined direction, over a narrow angular range, as provided by a light collector such as a microlens. In other examples, each microlens produces an image of a narrow angular range of the visual field on a plurality of detectors, such as detector sub-arrays. Image processing is then used to produce image data from the mosaic of sub-image data provided by the plurality of detector sub-arrays. Each detector sub-array may comprise a small number of individual detectors, such as 10 or 100 individual detectors.

In other examples, detector sub-arrays are formed in a detector array, such as one having several million individual detectors. Light guides are used to channel light from a predetermined narrow angular range of the visual field to the detector sub-array. As above, image processing is used produce image data from the mosaic of sub-image data provided by the plurality of detector sub-arrays.

Light collectors may be disposed over the surface of a substantially hemispherical or semicircular surface. Light collectors include lenses, such as microlenses, mirrors, Fresnel lens arrays, windows, apertures, polished flat or shaped ends of optical fibers, ends of other light guides (discussed below), windows, and the like. Microlenses or other light collectors may be circular or polygonal.

The term microlens, as used in this specification, refers to a lens having a diameter substantially smaller than the overall dimensions of the vision sensor, and does not necessarily imply miniature dimensions.

Microlenses can be fixed focus, and can have a focal length chosen to focus objects at infinity on an associated detector, or to focus on objects a typical distance away, such as in the range 10 feet–100 yards. This may not be very critical in typical applications.

A light guide optionally is used to guide light between a light collector and a detector, and may include an optical fiber, aperture, tube, mirror, one or more lenses, channel, prism, internally mirrored structure, and glass or optical plastic form, and the like. The light guide can also be used to optically isolate neighboring microlenses, or separators can be used for this purpose, for example an opaque or other light-absorbing structure used for optical isolation.

Light guides may be fabricated by heating and at least partially stretching a bundle of glass or plastic rods, so as to provide a plurality of light guides collecting light and channeling the light to one end of the bundle.

In other examples, a wide angle lenses can be used in place of a microlens array, such as fish-eye lenses. Other possible configurations include multiple vision sensors pointing in different directions, use of multiple mirrors to create projective wide images. Other wide angle panoramic spherical vision sensors can be used. An example wide angle lens which may be used in examples of the present invention is described in U.S. Pat. No. 6,590,719 to Bos.

Antireflection films, such as interferometric films, or a regular array of microrods similar to those found on the eye of a moth, may also be provided on the light-receiving surface of the vision sensor. Apertures may also be provided, in addition to microlenses, for example to restrict the angular acceptance angle.

The light guide and the light collector can be the same unitary structure, for example a teardrop shaped or frusto-conical form with the bulbous end towards the outer surface of the vision sensor, and the narrow end directing light to a detector. The light guide may have a circular or polygonal (such as hexagonal) cross-section, analogous to an insect eye. This is discussed in more detail below.

Vision Sensors with Insect Eye Structure

A vision sensor according to the present invention can have a structure analogous to that of an insect eye, such as the eye of the honey bee. A vision sensor according to the present invention may include a plurality of detectors separated by an effective inter-detector angle. The light collectors may be arrayed over a curved surface, such as a hemispherical or spherical surface.

The honey bee has a compound eye. Each individual eye is called an ommatidium, and a bee compound eye comprises several thousand individual ommatidia. Each ommatidium includes a lens, sometimes called a facet, a crystalline cone beneath the lens, and associated light sensitive cells. The bee eye lenses are generally hexagonal. Pigment cells optically isolate each ommatidium. Photoreceptor cells provide an electrical output for various wavelength ranges. A vision sensor according to the present invention may have an analogous structure, for example comprising a plurality of hexagonal lenses with light-absorbing separators.

For example, microlenses may be arranged in a hexagonal array over a curved surface. Each microlens focuses light from a predetermined direction, with narrow angular range, onto an individual detector. A light guide having a structure similar to the crystalline cone of a bee may be provided. Such a light guide may have a tapered structure, such as a conical shape or portion thereof, and may have a hexagonal cross-section.

Separators between microlens/detector combinations (vision sensor elements) may comprise a light absorbing material, or may allow some light transmission so as to increase low-light sensitivity. Electrochromic materials can be used to adjust inter-element transmission.

Images produced by vision sensors according to the present invention may be somewhat distorted compared with that produced by a conventional imaging device. However, any distortions can be corrected algorithmically, for example within an analysis circuit, and distortion may not be important in relation to collision warning applications.

Detectors

Detectors, providing an electrical signal in response to light, may be provided in close proximity to the light collecting elements. In other examples, light guides can be used to channel collected light to detectors.

Detectors may be simple binary detectors, providing either a light or dark signal output. Alternatively, detectors may provide gray-levels or color outputs.

A detector may comprise a CMOS or MOS photodetector, phototransistor, photodiode, or other semiconductor device or other device providing an electrical signal correlated with incident light fluctuations. Detectors may be part of a detector array, such as a CMOS array.

Detectors may be sensitive to non-visible wavelengths, such as IR or UV. Filters can be used to removed less useful wavelengths, or otherwise to increase performance, for example by increasing contrast between hazardous objects and background. Detectors may also be sensitive to light polarization, for example by providing an external polarizer.

Warnings

It can be assumed that the approximate reaction time to any unexpected event is constant. This may be fairly accurate in most practical cases. Hence, the scaling of qualitative distances obtained from optical flow analysis with vehicle velocity can be advantageous.

It is more important to know the time that the vehicle operator has to react to an unexpected event, rather than the actual or quantitative distance to the object. Hence, in an improved collision warning or avoidance system, it is not necessary to determine the true distance to an object. If the velocity of the vehicle is small, a close object is less dangerous than if the velocity is higher because the system will have a longer time to react.

A collision avoidance response may comprise an audible, visual, or haptic alert provided to a vehicle operator, using existing warning devices or other device. Warnings may also be provided to the general environment of the vehicle, and/or targeted in the direction of the obstacle. For example, vehicle lights may flash or a horn may sound.

The collision avoidance response may further comprise automatic vehicle control inputs, for example steering (such as redirection, for example, by control surfaces of an airplane or a boat rudder), braking, operator ejection, vehicle self-destruction, laser destruction of the obstacle (for example, for a space vehicle approaching an asteroid), engine/transmission control inputs (such as stop, idle, dead slow, or reverse), and the like. These automated responses may be overridden by a human vehicle operator if appropriate.

A collision avoidance system according to the present invention can also be used to assist a vehicle operator in parking a vehicle.

For example, the collision of an airplane with another airplane or other object, such as a surface feature, may be avoided by automatic control signals triggered on detection of an imminent collision.

Warnings may use existing devices within a vehicle. For example, a horn may sound, or message relayed to the vehicle operator using speakers of an entertainment device (such as a radio) or through headphones, if appropriate. Additional devices may also be provided, for example a warning light, buzzer, and the like.

Other Examples

Apparatus and methods according to the present invention can be used in connection with various vehicles, such as automobiles, ships, airplanes, satellites, and spacecraft.

Spectral signatures, image analysis techniques, or other approaches can be used to exclude common non-threatening objects from analysis. For example, a system implemented on an aircraft may disregard clouds or mist. A system implemented on a boat may disregard birds.

The field of view may be restricted to close to the horizon for vehicles moving over the surface of the Earth (and not typically threatened by incoming projectiles), such as automobiles or ships. For example, the field of view orthogonal to the surface may be limited to 10, 20, 30, or some other angular range, and may not be symmetrical above and below the horizon.

Examples discussed have included visual imaging systems. However, vision sensors may also include IR (far-IR, mid-IR, near-IR), UV, x-ray, microwave, and/or radio-wave sensors, or other electromagnetic bands or combination of bands. Vision sensors may also use ultrasonic sensors, or other acoustic wave based sensors. Vision sensors may include (or be operated in conjunction with) transmitters, for example so as to enhance sensitivity to objects.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference.

Having described our invention, I claim:

The invention claimed is:

1. An apparatus providing a collision avoidance response to facilitate avoidance of a collision between a vehicle and an object, the apparatus comprising:
   a vision sensor providing image data; and
   an image analyzer, operable to provide an estimated time to collision of the vehicle with the object,
   the estimated time to collision being determined from the rate of expansion of an image element within the image data, the image element corresponding to at least part of the object,
   the apparatus providing the collision avoidance response if the estimated time to collision is less than or approximately equal to a predetermined time.

2. The apparatus of claim 1, wherein the vision sensor provides a substantially hemispherical field of view.

3. The apparatus of claim 1, wherein the vision sensor provides a substantially spherical field of view.

4. The apparatus of claim 1, the vision sensor comprises a plurality of light collectors disposed over a curved surface.

5. The apparatus of claim 1, the vision sensor further comprising a plurality of light detectors, wherein each light collector is optically coupled to at least one light detector, the image data being derived from electrical signals provided by the plurality of light detectors.

6. The apparatus of claim 4, wherein the plurality of light collectors disposed over a curved surface is a plurality of lenses arranged over a hemispherical surface.

7. The apparatus of claim 1, comprising a pair of vision sensors cooperatively providing a field of view of 360 degrees in at least one plane.

8. The apparatus of claim 7, wherein the pair of vision sensors each comprise a plurality of lenses disposed over a hemispherical surface.

9. The apparatus of claim 7, the pair of vision sensors cooperatively providing a spherical field of view.

10. The apparatus of claim 1, wherein the collision avoidance response comprises an audible signal.

11. The apparatus of claim 1, wherein the collision avoidance response comprises a visual signal.

12. The apparatus of claim 1, wherein the collision avoidance response comprises an automatic slowing or redirection of the vehicle.

13. An apparatus providing a collision avoidance response to facilitate collision avoidance between a vehicle and an object within a heading of the vehicle, the vehicle having a vehicle speed, the apparatus comprising:
a pair of vision sensors, the vision sensors having optical axes separated by approximately 180 degrees, the vision sensors providing image data;
an image analyzer, receiving the image data, the image analyzer performing an optical flow analysis of the image data and providing an estimated time to collision with the object; and
a collision avoidance mechanism providing a collision avoidance response if the estimated time to collision is less than a predetermined time.

14. The apparatus of claim 13, wherein the estimated time to collision is determined using the magnitude of an optical flow vector for an image element corresponding to the object.

15. The apparatus of claim 13, wherein the image analyzer determines if the object is in the heading of the vehicle by comparing the optical flow vector with a focus of expansion within the image data.

16. The collision avoidance system of claim 15, wherein the estimated time to collision with the object is determined from a ratio of a magnitude of the optical flow vector to a distance between the optical flow vector and the focus of expansion.

17. The apparatus of claim 13, wherein the collision avoidance system includes an audio generator, the collision avoidance response including an audible warning to a vehicle operator.

18. The apparatus of claim 13, wherein the collision avoidance system includes a steering control, the collision avoidance response including a change in the heading of the vehicle.

19. The apparatus of claim 13, wherein the collision avoidance system includes a brake control, the collision avoidance response including a reduction of the vehicle speed.

20. The apparatus of claim 13, wherein each vision sensor comprises a hemispherical surface supporting a plurality of light collectors, each light collector being optically coupled to a light detector.

21. The apparatus of claim 13, wherein each vision sensor comprises a plurality of lenses disposed over a hemispherical surface, each lens directing light to a light detector.

22. A method of facilitating avoidance of a vehicle collision with an object, the vehicle having a vehicle speed, and having a vehicle operator and vehicle surroundings, the method comprising:
providing a vision sensor having a wide field of view of the vehicle surroundings;
obtaining time-sequential image data from the vision sensor corresponding to the vehicle surroundings;
determining an optical flow vector corresponding to an image element within the image data, the image element corresponding to a portion of the object;
determining an estimated time to collision with the object using the optical flow vector; and
providing a collision avoidance response to the vehicle operator if the time to collision is less than a predetermined time.

23. The method of claim 22, wherein the estimated time to collision is determined from a ratio of the magnitude of the optical flow vector with a distance of the optical flow vector from a focus of expansion within the image data.

24. The method of claim 22, wherein the step of providing a vision sensor includes providing a pair of vision sensors, each vision sensor having a hemispherical field of view, the pair of vision sensors facing in opposed directions so as to cooperatively provide a spherical field of view.

25. The method of claim 22, wherein the collision avoidance response includes a visual alert to the vehicle operator.

26. The method of claim 22, wherein the collision avoidance response includes an audible alert to the vehicle operator.

27. The method of claim 22, wherein the collision avoidance response includes a haptic alert to the vehicle operator.

* * * * *